United States Patent
Schuster

[15] 3,704,913
[45] Dec. 5, 1972

[54] BOLSTER HOIST FOR A DUMP VEHICLE

[72] Inventor: Donald E. Schuster, 805 S. 9th Street, Humboldt, Iowa 50548

[22] Filed: July 28, 1971

[21] Appl. No.: 166,840

[52] U.S. Cl. .................................................. 298/22 J
[51] Int. Cl. .................................................. B60p 1/20
[58] Field of Search .................... 298/22 J, 22 P, 22 R

[56] References Cited

UNITED STATES PATENTS

| | | | |
|---|---|---|---|
| 2,332,961 | 10/1943 | Wood | 298/22 J |
| 2,836,460 | 5/1958 | Lundell | 298/22 J |
| 2,849,255 | 8/1958 | Pasker | 298/22 J |

*Primary Examiner*—Richard J. Johnson
*Assistant Examiner*—Reinhard Eisenzopf
*Attorney*—Zarley, McKee & Thomte

[57] ABSTRACT

A bolster hoist for a dump vehicle comprising a first support pivotally secured to the vehicle frame and having first and second arms extending rearwardly therefrom. Third and fourth arms are pivotally secured at their rearward ends to the rearward ends of the first and second arms and are secured at their forward ends to a second support pivotally secured to the dump body. First and second links are pivotally secured at their upper ends to the first and second arms at the forward ends thereof respectively and have the forward ends of first and second bars pivotally secured at their lower ends. First and second levers are pivotally secured at their lower ends to the rearward ends of the first and second bars and are pivotally connected intermediate their ends to the pivotal connection of the first, third and second, fourth arms. A hydraulic cylinder is pivotally connected at its base end to the first and second links intermediate the ends thereof and is pivotally connected at its rod end to the upper rearward ends of the third and fourth arms. A cross bar extends between the rearward ends of the third and fourth arms and is engaged by the upper ends of the first and second levers during the initial extension of the rod from the cylinder to increase the leverage applied to the third and fourth arms.

7 Claims, 6 Drawing Figures

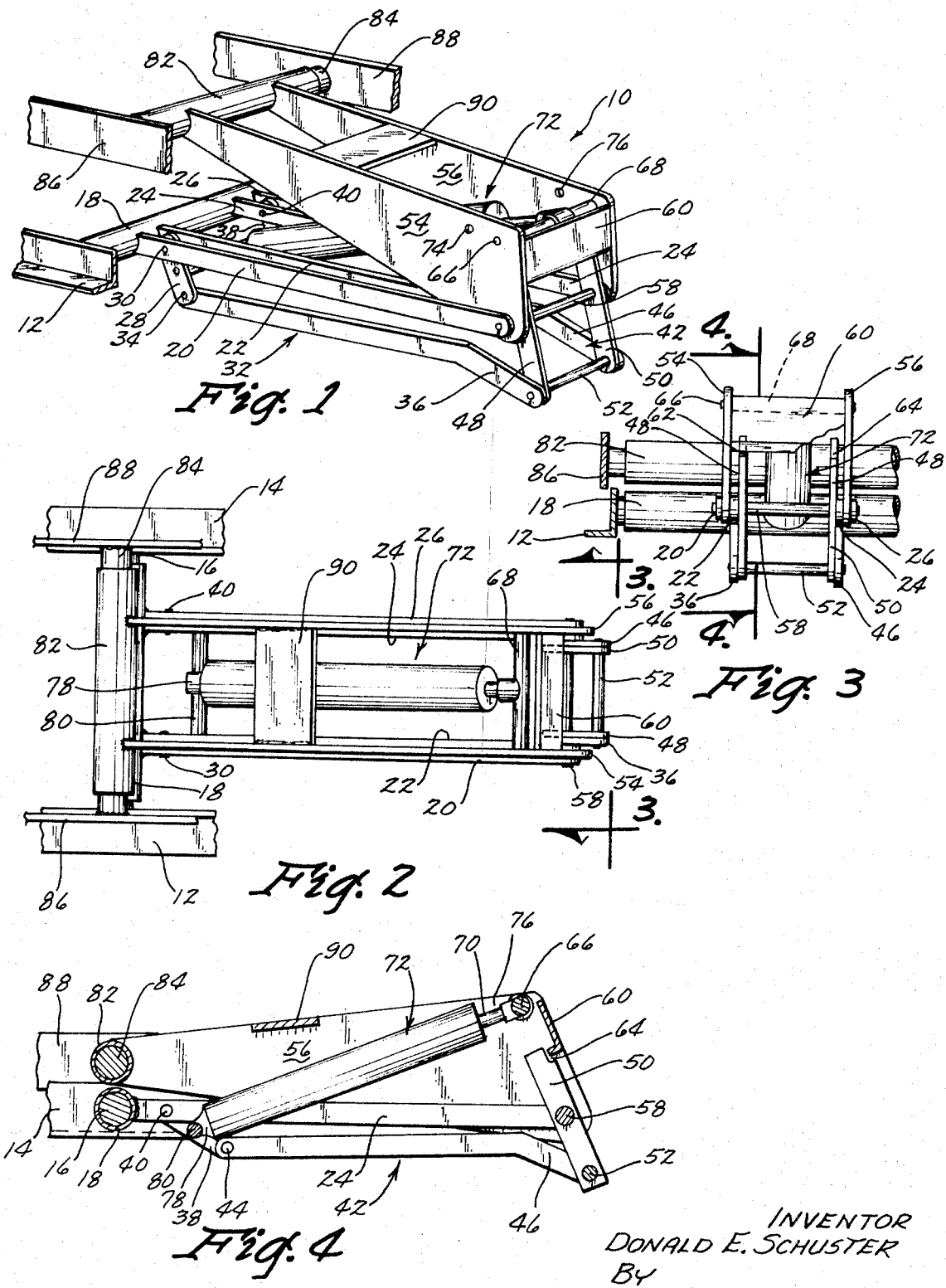

BOLSTER HOIST FOR A DUMP VEHICLE

Bolster hoists are commonly used to raise the dump body of a dump vehicle to cause the contents thereof to flow therefrom. This invention pertains to a bolster hoist for a dump vehicle and it is a principal object of this invention to provide an improved bolster hoist.

A principal object of this invention is to provide a bolster hoist for a dump vehicle wherein additional leverage is achieved through longitudinal movement of the hydraulic cylinder.

A further object of this invention is to provide a bolster hoist for a dump vehicle including a pivotal lever means which exerts additional leverage to the pivotal arms secured to the dump body.

A further object of this invention is to provide a bolster hoist for dump vehicles which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a rear perspective view of the invention;

FIG. 2 is a top view of the device;

FIG. 3 is a partial view of the device as seen along lines 3—3 of FIG. 2 with portions thereof cut away;

FIG. 4 is a sectional view as seen along lines 4—4 of FIG. 3;

Figure 5:
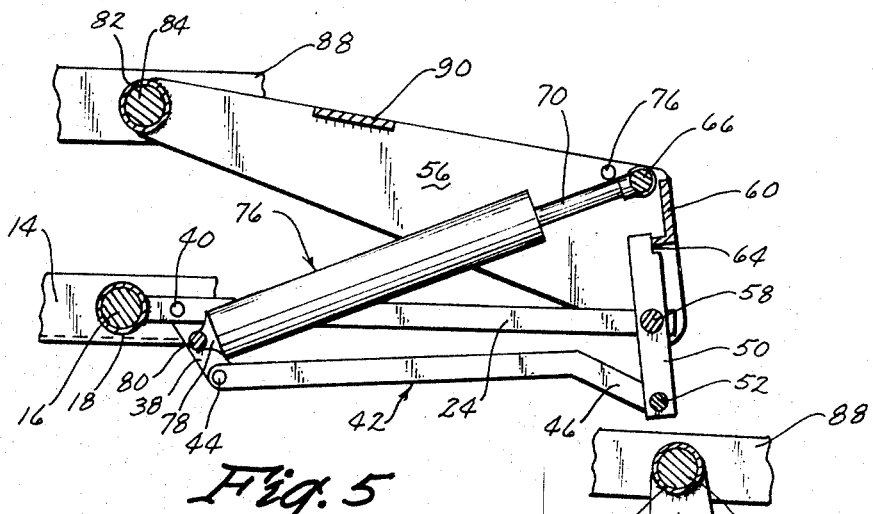
FIG. 5 is a view similar to FIG. 4 which illustrates the hoist in a partially raised position.
Figure 6:
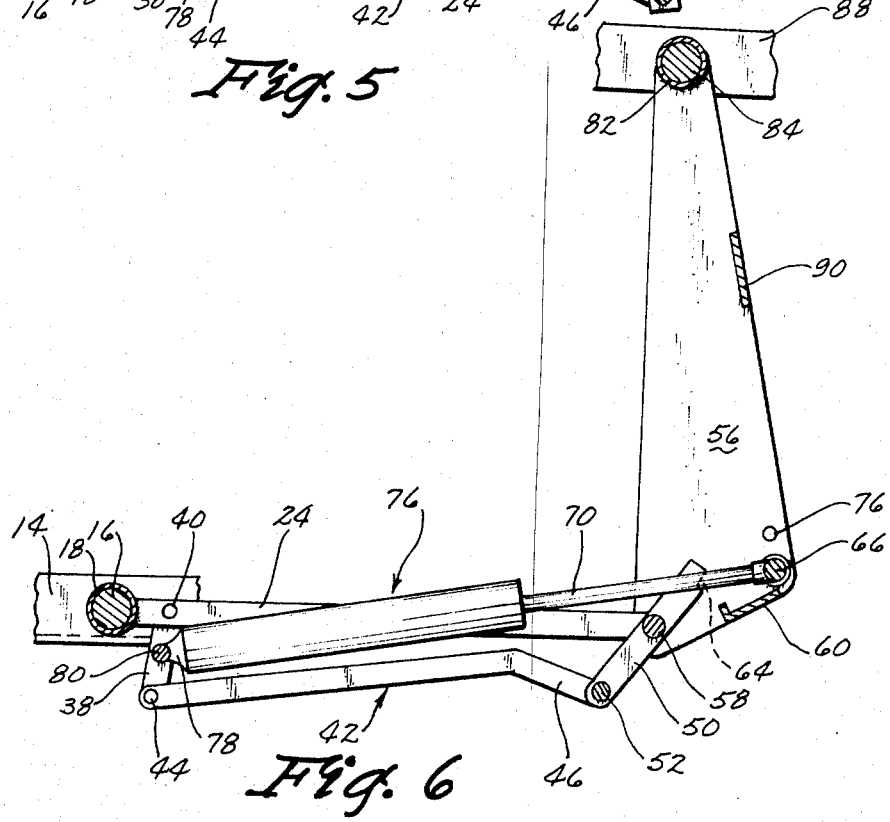
FIG. 6 is a view similar to FIGS. 4 and 5 illustrating the hoist in an extended or raised position.

The bolster hoist of this invention is referred to generally by the reference numeral 10 and is designed for use with a conventional dump vehicle such as a wagon or a dump truck. Angle members 12 and 14 are adapted to be secured to the vehicle frame by any convenient means and have a shaft 16 secured thereto which extends therebetween. The numeral 18 designates a tubular support or pipe which rotatably embraces the shaft 16 in the manner illustrated in FIGS. 2 and 4. Arms 20 and 22 are secured to the rearward end of pipe 18 by welding or the like in a spaced apart relationship and extend rearwardly therefrom. Arms 24 and 26 are secured to pipe 18 by welding or the like and extend rearwardly therefrom in a spaced apart relationship as illustrated in the drawings.

A link 28 is pivotally connected at its upper end to the forward ends of arms 20 and 22 by pin 30. The lower end of link 28 has a bar 32 pivotally connected thereto by means of pin 34. Bar 32 extends rearwardly from link 28 and is provided with a downwardly extending bar portion 36 at its rearward end. Link 38 is pivotally connected to the arms 24 and 26 adjacent the forward end thereof by means of pin 40. The lower end of link 38 has a bar 42 pivotally connected thereto by means of pin 44. Bar 42 is identical to bar 32 and has a downwardly extending bar portion 46 at its rearward end.

Levers 48 and 50 are pivotally connected at their lower ends to the rearward ends of bars 32 and 42 by shaft 52 as seen in FIG. 1. The numerals 54 and 56 refer to arms which are generally triangular in shape. The lower rearward end of arm 54 is pivotally connected to the arms 20 and 22 and the lever 48 by means of shaft 58. Shaft 58 also provides the pivotal connection between the rearward ends of the arms 24 and 26 with the lever 50 and the lower rearward end of arm 56.

A cross bar 60 is secured to and extends between the upper rearward ends of arms 54 and 56. Levers 48 and 50 are provided with notches 62 and 64 formed in the upper rearward ends thereof respectively which are adapted to engage the lower end of the cross bar 60. FIG. 4 illustrates the manner in which the lever 50 engages the cross bar 60.

Shaft 66 is secured to and extends between the upper rearward ends of arms 54 and 56 and has a sleeve 68 rotatably mounted thereon. Sleeve 68 is connected to the rod 70 of hydraulic cylinder 72 by means of welding or the like. Arms 54 and 56 are provided with openings 74 and 76 as seen in FIG. 1 to provide an alternate position for the shaft 66. The base or bottom end 78 of hydraulic cylinder 72 is secured to a shaft 80, the opposite ends of which are rotatably received and secured to the links 28 and 38 intermediate the lengths thereof. Hydraulic cylinder means 72 is connected to a source of fluid under pressure to permit the extension of the rod 70.

The tubular support or pipe 82 is secured to the forward ends of arms 54 and 56 and is rotatably mounted on a shaft 84 which is secured to and extends between support members 86 and 88. The support members 86 and 88 are operatively connected to the dump body in conventional fashion. Brace 90 is secured to and extends between arms 54 and 56 as seen in FIG. 1.

The normal method of operation is as follows. FIG. 4 illustrates the hoist in its lowermost position. When it is desired to tilt or dump the vehicle dump body, hydraulic fluid under pressure is supplied to the hydraulic cylinder 72 which causes the extension of the rod 70. The initial movement or extension of the rod 70 from the hydraulic cylinder 72 causes the base or bottom end 78 of the hydraulic cylinder 72 to exert thrust upon the links 28 and 38 through the shaft 80. The thrust imposed on the links 28 and 38 causes the links to pivot in a clockwise direction as viewed in FIG. 4 about the pins 30 and 40 so that the bottom end of the cylinder moves rearwardly and downwardly. The pivotal movement of the links 28 and 38 causes the bars 32 and 42 to be moved rearwardly which causes the levers 48 and 50 to pivot about shaft 58 and bear against the cross bar 60 so that additional leverage is exerted on the arms 54 and 56. The additional leverage exerted on the arms 54 and 56 by the levers 48 and 50 together with the extension of the rod 50 causes the arms 54 and 56 to be raised from the collapsed position of FIG. 4 so that the dump body is raised. After the arms 54 and 56 are raised an initial increment, the levers 48 and 50 disengage from the cross bar 60 and the cylinder 72 exerts force against the arms 54 and 56 in the conventional manner.

The engagement of the levers 48 and 50 with the cross bar 60 provides additional leverage for the hoist so that the dump body is raised in a smooth and efficient manner. Thus it can be seen that the device accomplishes at least all of its stated objectives.

I claim:

1. In combination with a dump vehicle having a frame means and a dump body pivotally mounted thereon, said vehicle having rearward and forward ends,
   a first support rotatably secured about a horizontal axis to said frame means, said axis being parallel to the pivotal axis of connection between said frame means and said dump body,
   first and second spaced apart arm means rigidly secured to said first support and extending rearwardly therefrom,
   a second support rotatably secured about a horizontal axis to said dump body, said axis being parallel to said first mentioned horizontal axis,
   third and fourth spaced apart arm means rigidly secured to said second support and extending rearwardly therefrom, said third and fourth arm means having upper and lower end portions at the rearward end thereof,
   a first means pivotally securing the rearward ends of said first and second arm means to the lower rearward ends of said third and fourth arm means,
   a first link means with upper and lower ends pivotally secured at its upper end to said first arm means adjacent the forward end thereof and extending downwardly therefrom,
   a second link means with upper and lower ends pivotally secured at its upper end to said second arm means adjacent the forward end thereof and extending downwardly therefrom,
   a first bar means with forward and rearward ends pivotally connected at its forward end to the lower end of said first link means and extending rearwardly therefrom,
   a second bar means with forward and rearward ends pivotally connected at its forward end to the lower end of said second link means and extending rearwardly therefrom,
   a first lever means with upper and lower ends pivotally secured at its lower end to the rearward end of said first bar means,
   a second lever means with upper and lower ends pivotally secured at its lower end to the rearward end of said second bar means,
   said first and second lever means being pivotally connected intermediate their upper and lower ends to said first means,
   a hydraulic cylinder means with a base end and an extendible rod extending from the other end thereof, sad cylinder means being pivotally connected at its base end to said first and second link means between the upper and lower ends thereof, said rod being pivotally connected to said third and fourth arm means adjacent the upper rearward ends thereof, said cylinder means adapted to pivot said arm means from an initial collapsed position to an extended position,
   a cross bar means secured to and extending between the rearward ends of said third and fourth arm means,
   the upper end of said first and second lever means initially engaging said cross bar means when said rod is extended from said cylinder means, the initial extension of said rod causing said base end to pivot said first and second link means downwardly and forwardly with respect to the pivotal connection at the upper ends thereof whereby said base end of said cylinder means is moved forwardly with respect to said first and second arm means and so that said first and second link means move said first and second bar means forwardly to cause said first and second lever means to initially exert additional pivotal leverage on said third and fourth arm means.

2. The combination of claim 1 wherein said cross bar means extends between said third and fourth arm means at the upper rearward ends thereof, said cross bar means having upper and lower ends, and forward and rearward sides, said first and second lever means initially engaging said cross bar means at the lower forward end thereof.

3. The combination of claim 2 wherein said lever means have notches formed in their upper rearward ends which initially receive the lower forward end of said cross bar means.

4. The combination of claim 2 wherein said rod is pivotally connected to said third and fourth arm means forwardly and above the lower forward end of said cross bar means.

5. The combination of claim 1 wherein said bar means each have a rearwardly and downwardly extending end portion which are pivotally connected to said first and second lever means.

6. The combination of claim 1 wherein said first and second link means extend downwardly and rearwardly from their pivotal connection with said first and second arm means.

7. The combination of claim 6 wherein a shaft means is pivotally secured to and extends between said first and second link means between the upper and lower ends thereof, said base end of said hydraulic cylinder means being secured to said shaft means.

* * * * *